(12) United States Patent
Minta

(10) Patent No.: US 10,228,070 B2
(45) Date of Patent: Mar. 12, 2019

(54) CHECK VALVES

(71) Applicant: Hamilton Sundstrand Corporation, Charlotte, NC (US)

(72) Inventor: Zbigniew Minta, Wroclaw (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 200 days.

(21) Appl. No.: 15/378,605

(22) Filed: Dec. 14, 2016

(65) Prior Publication Data

US 2017/0167620 A1    Jun. 15, 2017

(30) Foreign Application Priority Data

Dec. 14, 2015    (EP) .................................... 15461582

(51) Int. Cl.
*F16K 15/03* (2006.01)
*F16K 27/02* (2006.01)

(52) U.S. Cl.
CPC ........ *F16K 27/0209* (2013.01); *F16K 15/038* (2013.01); *Y10T 137/7839* (2015.04); *Y10T 137/7891* (2015.04)

(58) Field of Classification Search
CPC ......... Y10T 137/7839; Y10T 137/7891; F16K 27/0209; F16K 15/038
See application file for complete search history.

(56) References Cited

U.S. PATENT DOCUMENTS

| | | | | |
|---|---|---|---|---|
| 3,559,679 A | * | 2/1971 | Smirra | F16K 1/223 137/512.1 |
| 4,043,358 A | * | 8/1977 | Sliski | F16K 15/038 137/512.1 |
| 4,078,268 A | * | 3/1978 | Possis | A61F 2/2403 137/512.1 |
| 4,146,048 A | * | 3/1979 | McCabe | A62C 2/14 126/285 R |
| 4,196,745 A | * | 4/1980 | Schutzer | F16K 1/223 137/512.1 |
| 4,249,567 A | * | 2/1981 | Weiss | F16K 15/038 137/512 |
| 4,254,508 A | * | 3/1981 | Bokros | A61F 2/2403 137/512.1 |
| 4,272,854 A | * | 6/1981 | Bokros | A61F 2/2403 137/512.1 |
| 4,276,658 A | * | 7/1981 | Hanson | A61F 2/2403 137/512.1 |
| 4,308,624 A | * | 1/1982 | Klawatter | A61F 2/2406 137/512.1 |
| 4,325,536 A | | 4/1982 | Garrett | |

(Continued)

FOREIGN PATENT DOCUMENTS

GB    2046405 A    11/1980

OTHER PUBLICATIONS

European Search Report for Application No. 15461582.7-1751; dated Jun. 2, 2016; 6 pages.

*Primary Examiner* — Craig Schneider
*Assistant Examiner* — Frederick D Soski
(74) *Attorney, Agent, or Firm* — Cantor Colburn LLP

(57) ABSTRACT

A check valve comprises a valve housing defining a valve opening and a web extending across the valve opening. First and second mounting posts are provided on the valve housing on opposite sides of the opening and extend away from the opening. Each mounting post has a transverse bore formed therein.

15 Claims, 4 Drawing Sheets

(56) References Cited

U.S. PATENT DOCUMENTS

| | | | | |
|---|---|---|---|---|
| 4,351,358 A | * | 9/1982 | Ogle, Jr. | F16K 15/035 137/512.1 |
| 4,445,533 A | * | 5/1984 | DeFrees | F16K 15/036 137/512.1 |
| RE32,362 E | * | 2/1987 | McCabe | A62C 2/14 137/15.25 |
| 4,863,458 A | * | 9/1989 | Bokros | A61F 2/2403 623/2.26 |
| 4,863,467 A | * | 9/1989 | Bokros | A61F 2/2403 623/2.3 |
| 4,867,199 A | * | 9/1989 | Marx | F16K 15/038 137/512.1 |
| 4,872,875 A | * | 10/1989 | Hwang | A61F 2/2403 623/2.22 |
| 4,888,010 A | * | 12/1989 | Bokros | A61F 2/2403 623/2.3 |
| 4,896,695 A | * | 1/1990 | Pysh | F16K 15/038 137/512.1 |
| 5,061,278 A | * | 10/1991 | Bicer | A61F 2/2403 137/512.1 |
| 5,143,117 A | * | 9/1992 | Klein | E03C 1/104 137/512.15 |
| 5,178,632 A | * | 1/1993 | Hanson | A61F 2/2403 137/512.1 |
| 5,197,980 A | * | 3/1993 | Gorshkov | A61F 2/2403 137/512.1 |
| 5,301,709 A | * | 4/1994 | Gasaway | F16K 15/038 137/15.18 |
| 5,518,026 A | * | 5/1996 | Benjey | B60K 15/04 137/512.15 |
| 5,711,343 A | * | 1/1998 | Beckett | F16K 15/038 137/512.1 |
| 5,743,512 A | | 4/1998 | Greenberg | |
| 5,988,589 A | | 11/1999 | Mowill | |
| 6,098,656 A | * | 8/2000 | Farina | F16K 15/031 137/512.1 |
| 6,237,625 B1 | * | 5/2001 | Randolph | F16K 15/038 137/512.15 |
| 7,032,884 B2 | | 4/2006 | Horner et al. | |
| 7,506,858 B2 | | 3/2009 | Brinks | |
| 9,027,907 B2 | | 5/2015 | Brinks et al. | |
| 2003/0213522 A1 | * | 11/2003 | O'Shea | F16K 15/03 137/512.1 |
| 2007/0107981 A1 | | 5/2007 | Sicotte | |
| 2007/0235088 A1 | * | 10/2007 | Klein | F16K 15/031 137/512.15 |
| 2008/0023080 A1 | * | 1/2008 | McGonigle | F16K 15/038 137/512.15 |
| 2008/0053536 A1 | * | 3/2008 | Denike | B64D 13/02 137/512.1 |
| 2008/0053537 A1 | * | 3/2008 | McGonigle | F16K 1/22 137/512.1 |
| 2008/0072973 A1 | * | 3/2008 | McGonigle | B64D 13/02 137/512.1 |
| 2008/0072974 A1 | * | 3/2008 | Denike | F16K 15/038 137/527 |
| 2008/0078458 A1 | * | 4/2008 | Denike | B64D 13/02 137/512.1 |
| 2008/0078459 A1 | * | 4/2008 | Warriner | B64D 13/02 137/512.1 |
| 2009/0056818 A1 | * | 3/2009 | McGonigle | F16K 15/038 137/527 |
| 2010/0236650 A1 | * | 9/2010 | Stredel | F16K 1/22 137/599.18 |
| 2012/0180880 A1 | * | 7/2012 | Pettit | F16K 15/038 137/511 |
| 2014/0041739 A1 | * | 2/2014 | Barone | F16K 15/038 137/516.25 |
| 2015/0068612 A1 | * | 3/2015 | Barone | F16K 15/038 137/15.18 |
| 2015/0240960 A1 | * | 8/2015 | Kamp | F16K 15/038 137/856 |
| 2015/0330524 A1 | * | 11/2015 | Talawar | F16K 15/03 137/527.8 |
| 2016/0018012 A1 | * | 1/2016 | Kamp | E05D 5/128 16/386 |
| 2016/0040792 A1 | * | 2/2016 | Kamp | F16K 15/03 137/15.19 |
| 2016/0040799 A1 | * | 2/2016 | Kamp | F16K 15/038 137/15.19 |
| 2016/0069461 A1 | * | 3/2016 | Chou | F16K 7/06 417/412 |
| 2016/0084393 A1 | * | 3/2016 | Barone | F16K 15/038 137/527 |
| 2016/0208939 A1 | * | 7/2016 | Patel | F16K 15/00 |
| 2017/0108133 A1 | * | 4/2017 | Reszewicz | F16K 15/03 |

\* cited by examiner

CHECK VALVES

FOREIGN PRIORITY

This application claims priority to European Patent Application No. 15461582.7 filed Dec. 14, 2015, the entire contents of which is incorporated herein by reference.

TECHNICAL FIELD

The present disclosure relates to check valves.

BACKGROUND

Check valves are valves that allow fluid flow in one direction therethrough and prevent flow in the opposite direction. They are widely used in a range of applications, for example in air conditioning systems, for example in aircraft air conditioning systems.

Check valves commonly include a pair of valve elements or flappers located at an opening in a valve housing. The flappers are hingedly supported on a hinge pin which extends between mounting posts arranged on the valve housing on opposite sides of the valve opening for rotation between a closed position in which they lie across and close the opening, preventing fluid flow through the opening in one direction and an open position in which, under the pressure of a fluid (gas or liquid) on one side of the check valve, the flappers rotate from their closed positions so as to allow the fluid to flow through the valve in the opposite direction.

The hinge pin must be mounted to the valve housing securely. Typically, a securing element such as a retaining ring is mounted to the housing. However, there remains the risk that such elements may loosen or even detach, leading to improper operation or even failure of the valve.

The present disclosure relates to a check valve which includes a modified hinge pin arrangement.

SUMMARY

Disclosed herein is a check valve comprising: a valve housing defining a valve opening and a web extending across the valve opening; first and second mounting posts provided on the valve housing on opposite sides of the opening and extending away from the opening, each mounting post having a transverse bore formed therein, the end of the transverse bore remote from the valve opening being at least partially closed; a central mounting post mounted to the web and extending away from the valve opening, the central mounting post having a first bore extending in a longitudinal direction and a second bore formed transversely therethrough, the second bore aligned with the transverse bores provided in the first and second mounting posts; a first hinge pin mounted between the transverse bore of the first mounting post and the second, transverse bore of the central mounting post; a second hinge pin mounted between the transverse bore of the second mounting post and the second, transverse bore of the central mounting post; a hinge pin locking retaining element arranged between adjacent ends of the first and second hinge pins within the second, transverse bore of the central mounting post; a fastener received in the longitudinal bore of the central mounting post for fastening the central mounting post to the web and maintaining the position of the hinge pin retaining element between the adjacent ends of the first and second hinge pins; and a pair of flapper elements pivotably mounted to first and second hinge pins for rotation between an open position in which they permit fluid flow through the opening and a closed position in which they prevent fluid flow through the opening. The first and second mounting posts may be formed integrally with the valve housing in one embodiment. Alternatively they may be formed separately therefrom and suitably mounted thereto.

In certain embodiments, the at least partially closed end of at least one of the transverse bores of the first and second mounting posts is fully closed.

In one embodiment, therefore, the at least one transverse bore may be a blind bore.

The blind bore may be suitably formed in the first or second mounting post by machining, for example drilling or milling.

In another embodiment, however, the at least one transverse bore may be partially closed by a wall having an aperture therethrough which allows access to a respective end of the respective hinge pin.

In various arrangements, a plug may be received within the transverse bore to partially or fully close the transverse bore.

In certain embodiments, the plug may receive an end of the respective hinge pin.

In certain embodiments, the plug may comprise a cup like portion having a cylindrical wall and an end wall which receive the end of the respective hinge pin received within the respective first or second mounting post transverse bore and receiving an end of the respective hinge pin. It may also further comprise a rim portion for engaging an inwardly facing surface of the respective mounting post around the respective mounting post transverse bore.

The plug may be made from a stronger, more durable or harder material than that of the respective mounting post.

In certain embodiments, the hinge pin retaining member may be formed by a portion of the fastener, for example by an upper end of the fastener. In other embodiments, however, the hinge pin retaining member may be separate from the fastener, but operatively coupled thereto.

In certain embodiments, the central mounting post may be received in a recess formed in a surface of the web.

The central mounting post may comprise locating means for locating the central post in proper alignment with the first and second mounting posts.

In various embodiments, the central mounting post may extend sufficiently from the web so as to form a stop for the flapper elements in their open position.

Also disclosed herein is a method of assembling a check valve as described above, the method comprising the steps of:

a. assembling the first and second flapper elements to the first and second hinge pins and the central mounting post, with first ends of the first and second hinge pins retracted into the second, transverse bore of the central mounting post;

b. positioning the assembly between the first and second mounting posts, with the first and second hinge pins aligned with the transverse bores of the first and second mounting posts;

c. moving second ends of the first and second hinge pins into the transverse bores of the first and second mounting posts;

d. inserting the hinge pin retaining element between the first ends of the first and second hinge pins to prevent the hinge pins from retracting from the transverse bores of the first and second mounting posts; and e. fastening the fastener within the longitudinal bore of the central mounting post to fasten the central mounting post to the web and to retain the hinge pin retaining element in its position.

In embodiments wherein the hinge pin retaining member is a part of the fastener member, steps d) and e) may be effected simultaneously by the act of mounting the fastener in position.

Some embodiments of the disclosure will now be described by way of example only with reference to the accompanying drawings in which:

DETAILED DESCRIPTION

Figure 1:
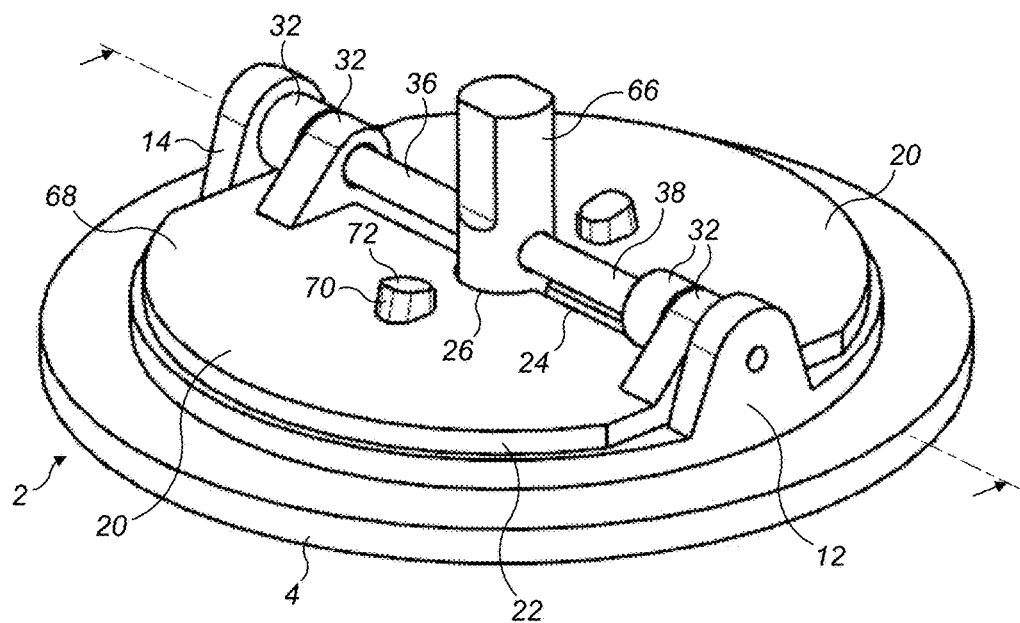
FIG. 1 shows a perspective view of a first embodiment of check valve in accordance with this disclosure, in a closed configuration.
Figure 2:
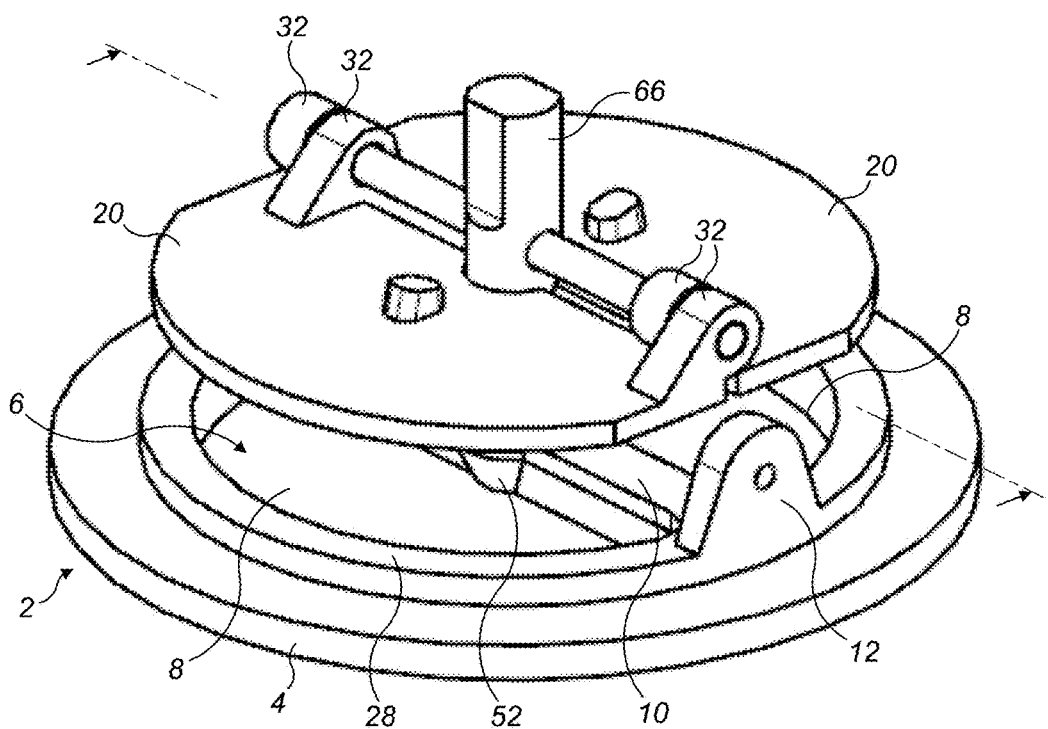
FIG. 2 shows a partially exploded view of the check valve of FIG. 1.

With reference to FIGS. 1 to 6, a first embodiment of check valve 2 in accordance with this disclosure is illustrated.

The check valve 2 comprises a generally annular valve housing 4. The valve housing 4 defines an opening 6 therethrough in the form of two generally D-shaped apertures 8 (see FIG. 4) separated by a central web 10 of the valve housing 4.

The valve housing 4 further comprises first and second mounting posts 12, 14 which are arranged on opposite sides of the valve opening 6. In this embodiment, the first and second mounting posts 12, 14 are formed integrally with the valve housing 4, for example cast with the housing or machined with it, but in other embodiments, they may be formed separately from the valve housing and suitably attached thereto.

Figure 3:
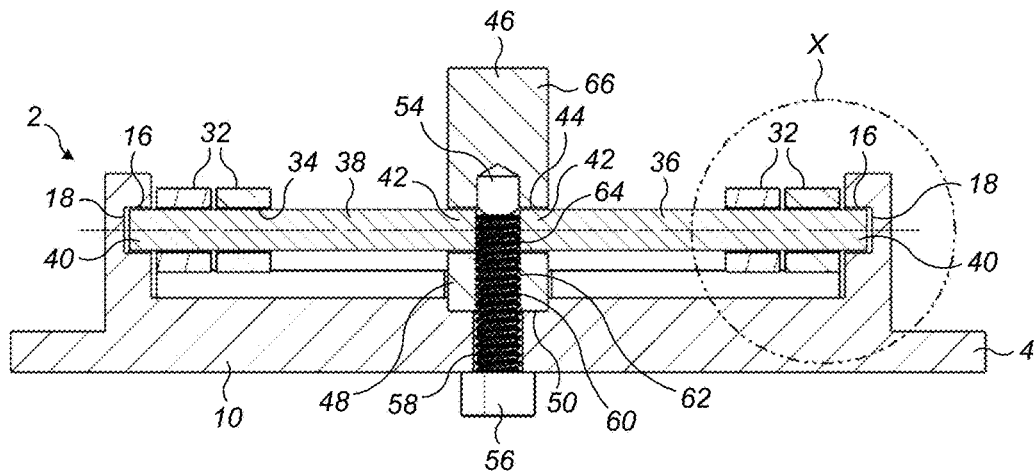
FIG. 3 shows a vertical section along line A-A of FIG. 1.

As can be seen from, for example, FIG. 3, each of the first and second mounting posts 12, 14 is formed with a transverse bore 16 which is at least partially closed, in this embodiment fully closed, at its end 18 remote from the valve opening 6, i.e. the transverse bores 16 are blind bores. The transverse bores 16 are aligned generally along a diameter of the opening 6, above the central web 10.

The opening 6 is closed by a pair of generally D-shaped flapper elements 20. Each flapper element 20 comprises an arcuate peripheral portion 22 and a generally linear portion 24 with a central cut out portion 26. The arcuate portion 22 seals against a raised arcuate lip 28 defined on the housing 4 around the respective aperture 8. The linear portion 24 with cut-out portion 26 seals against an upper surface 30 of the central web 10 which is a continuation of the upper surface of the lip 28.

Each flapper element 20 comprises a pair of mounting lugs 32, arranged at opposite sides of the flapper element 20.

A respective mounting lug 32 of each flapper element 20 is arranged adjacent one of the first and second mounting posts 12, 14, with the other mounting lug 32 arranged inwardly thereof.

The mounting lugs 32 each have a transverse bore 34 which are aligned with each other and with the transverse bores 16 of the first and second mounting posts 12, 14, for receiving first and second hinge pins 36, 38.

Each of the first and second hinge pins 36, 38 comprises a first end 40, which is received within the transverse bore 16 of a respective first or second mounting post 12, 14 and a second end 42 which is received within a transverse bore 44 of a central mounting post 46.

The central mounting post 46 is mounted to the central web 10 of the valve housing 4. The lower end 48 of the central mounting post 46 is received in a recess 50 formed in a tapered boss 52 formed in the central web 10. In some embodiments, the central web 10 and the lower end 48 of the central mounting post 46 may have locating features for maintaining the central mounting post 46 in the correct angular orientation for aligning its transverse bore 44 with the transverse bores 16 of the first and second mounting posts 12, 14. For example, in some embodiments, the recess 50 and the lower end 48 of the central mounting post 46 may have a complementary, non-circular shape, although other locating arrangements will be readily apparent.

The central mounting post 46 is formed with a longitudinal bore 54 extending upwardly from its lower end 48. The longitudinal bore 54 intersects the transverse bore 44. The longitudinal bore 54 receives a fastener 56 which extends through a bore 58 in the central web 10 into the recess 50. In this embodiment, the fastener 56 is threaded, at least over an intermediate portion 60 thereof, and at least a lower portion 62 of the longitudinal bore 54 is also threaded to threadingly receive the fastener 56. In this embodiment, the full length of the fastener 56 is threaded.

It will be seen from FIG. 3 that when the fastener 56 is fully inserted into the longitudinal bore 54, an upper end 64 of the fastener 56 is positioned between the respective second ends 42 of the first and second hinge pins 36, 38. Since the respective first ends 40 of the first and second hinge pins 36, 38 are received in the blind bores 16 of the first and second mounting posts 12, 14, the first and second hinge pins 36, 38 cannot move outwardly. Moreover, the fastener upper end 64 prevents the first and second hinge pins 36, 38 from moving inwardly. Thus the upper end 64 of the fastener 56 acts as a hinge pin retaining element, retaining the first and second hinge pins 36, 38 in position such that they cannot disengage from the first and second mounting posts 12, 14.

It will further be seen that the central mounting post 46 extends a significant further distance above the central web 10. This allows an upper part 66 of the central mounting post 46 to act as a stop for the flapper elements 20 in their open position. In this regard, an upper surface 68 of each flapper element 20 includes a stop element 70 having a flat, angled stop surface 72 formed thereon. The upper part 66 of the central mounting post 46 is formed with opposed, parallel flat surfaces 74 which will engage the stop surfaces 72 of the flapper elements 20 when they are fully open. The angling of the stop surfaces 72 is such that a face contact, rather than a line contact, is provided between the stop surfaces and the central mounting post 46, so as to dissipate impact forces.

Assembly of the check valve 2 will now be described with reference to FIGS. 4 to 6.

As a first step in assembly, the central mounting post 46 is arranged between the flapper elements 20 with its transverse bore 44 aligned with flapper element lug bores 34. The first and second hinge pins 36, 38 can then be inserted fully through the aligned bores 34, 44 such that the respective second ends 42 of the hinge pins 36, 38 are fully received in the transverse bore 44 of the central mounting post 46, as shown in FIG. 4. In this position, the first ends 40 of the hinge pins 36, 38 will not project a significant amount from the outer flapper lugs 32.

Figure 4:
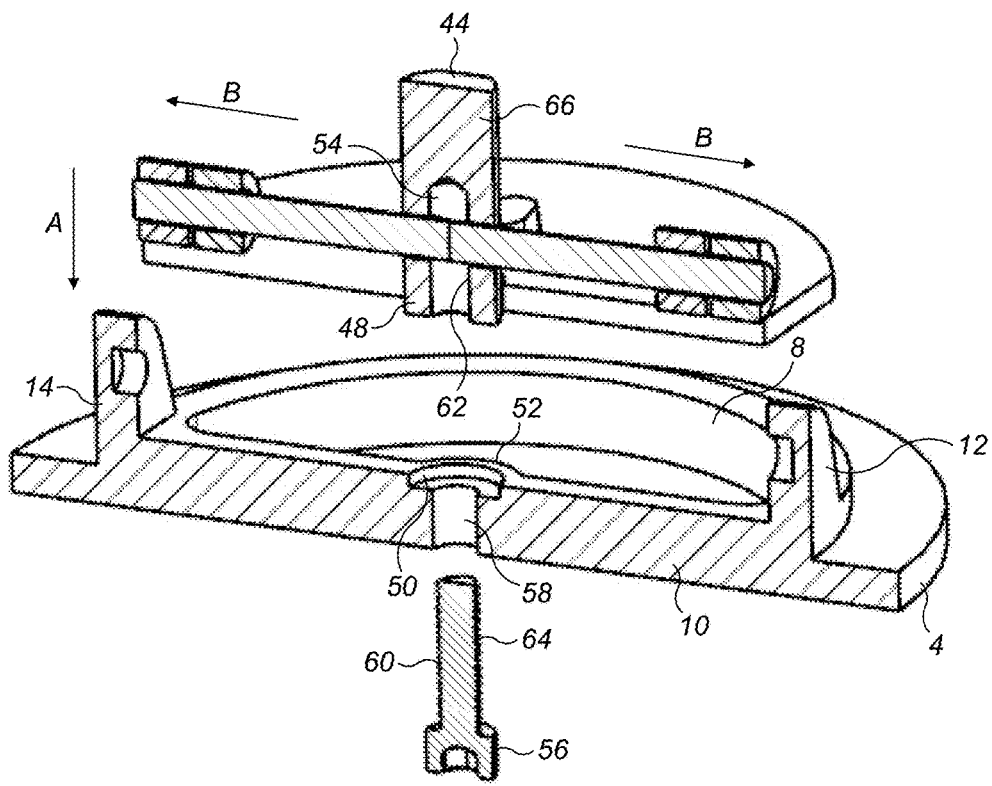
FIG. 4 shows a perspective sectional view along line IV-IV of FIG. 2 illustrating a first stage in the assembly of the check valve.
Figure 5:
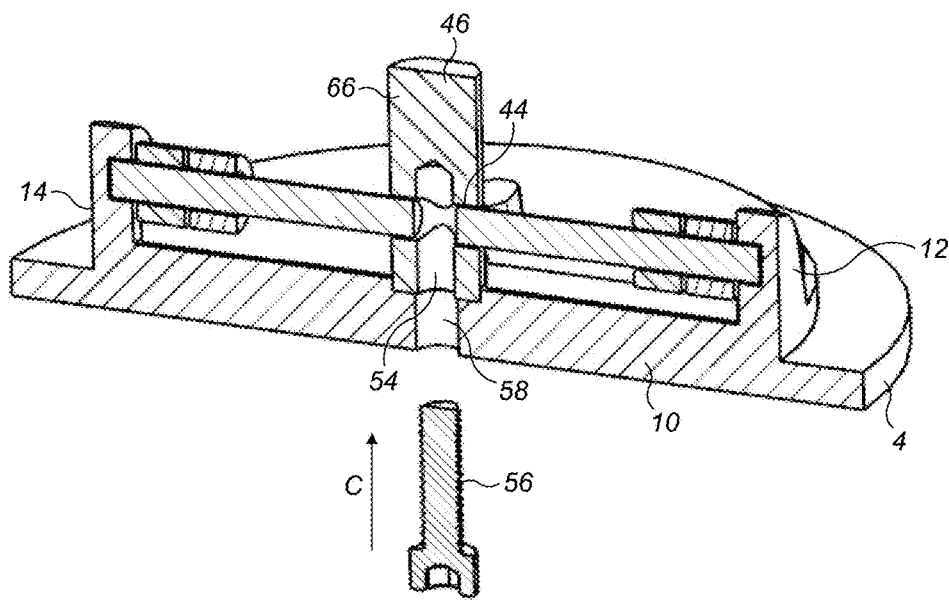
FIG. 5 shows a further perspective sectional view illustrating a second stage in the assembly of the valve.
Figure 6:
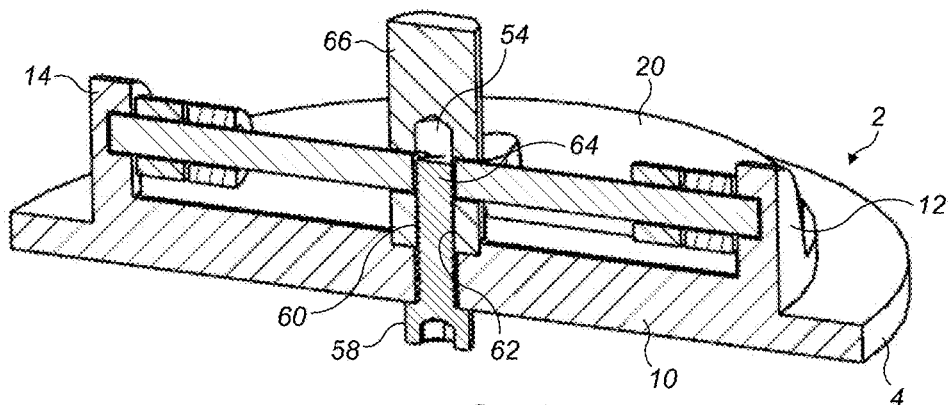
FIG. 6 shows a further perspective sectional view of the assembled valve.

This sub-assembly is then mounted to the valve housing 4 as illustrated in FIG. 5. The sub-assembly is moved between the first and second mounting posts 12, 14 (for example in a direction as illustrated by arrow A in FIG. 4) such that the hinge pins 36, 38 are aligned with the transverse bores 16 of the first and second mounting posts 12, 14. This is possible since, as discussed above, the hinge pins 36, 38 do not extend (or do not extend significantly) from the flapper mounting lugs 32. The central mounting post 46 will be received in the web recess 50.

The hinge pins 36, 38 are then moved outwardly, in the direction of arrows B in FIG. 4, such that the hinge pins 36, 38 enter the transverse bores 16 of the first and second mounting posts 12, 14. Since the bores 16 are blind bores, the hinge pins 36, 38 will be retained in the bores 16. This intermediate stage of assembly is illustrated in FIG. 5.

In the final stage of assembly, the fastener 56 is introduced through the web bore 58 and into the longitudinal bore 54 of the central mounting post 46 as illustrated by arrow C in FIG. 5. The fastener 56 is fully tightened such that the upper end 64 of the fastener 56 is positioned between the adjacent second ends 42 of the hinge pins 36, 38, as illustrated in FIG. 6, thereby retaining the hinge pins 36, 38 securely in position.

The described embodiment may have a number of advantages over existing forms of check valve. Firstly, a single fastener 52 is used to retain the hinge pins. This compares to existing designs wherein respective retaining elements may be required for both ends of the hinge pin.

Moreover, the fastener may be larger than the existing retaining elements, providing a more durable construction and making visual inspection of safety critical elements of the valve easier.

The materials used for the various components may be chosen appropriately depending on the expected operating conditions for the valve. In lower temperature applications, for example, the housing 4 and flapper elements 20 for example, may be made from an aluminium alloy. In higher temperature applications, however, a steel such as a nickel steel or a stainless steel may be used for the components.

It will be understood that various modifications may be made to the embodiment described above without departing from the scope of the disclosure.

Figure 7:
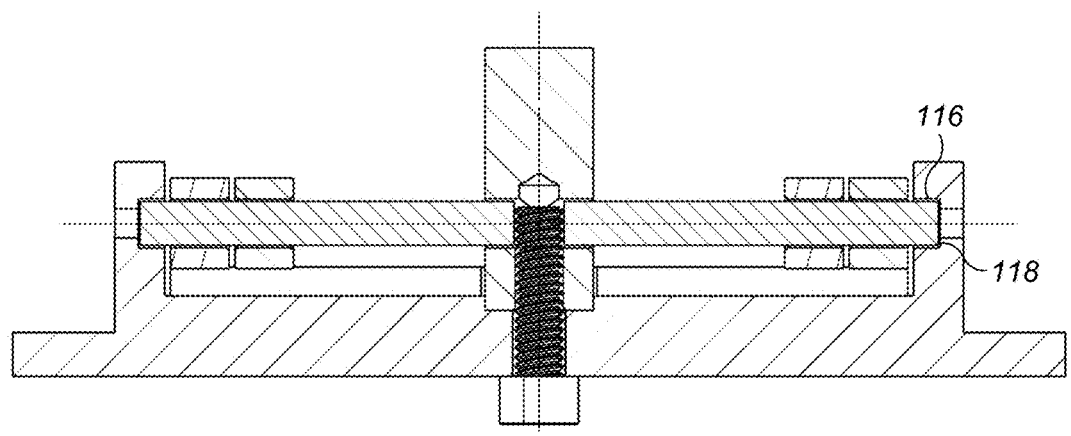
FIG. 7 shows an alternative embodiment.

In one embodiment, as illustrated in the detail shown in FIG. 7, the transverse bore 16 in the first and second mounting posts 12, 14 may be formed as counterbores 116. The shoulder 118 formed in the counterbore 116 prevents outward movement of the hinge pins 36, 38. Moreover, it allows access to the end of the respective hinge pins 36, 38.

Figure 8:
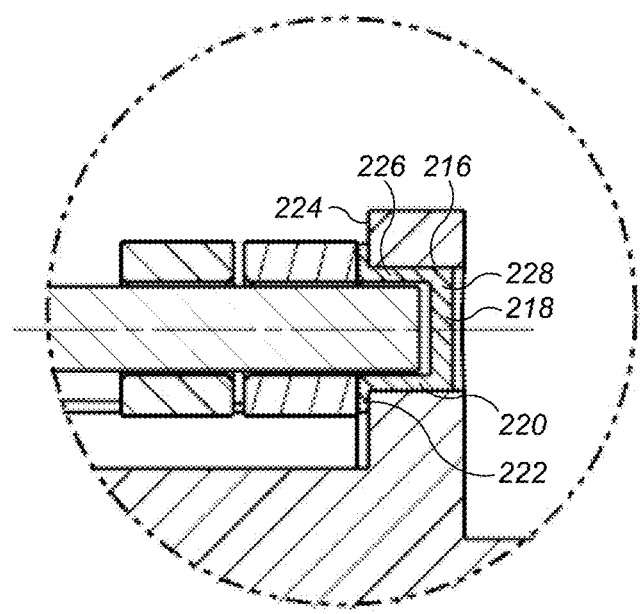
FIG. 8 shows a detail (X in FIG. 3) of a further alternative embodiment.

In another embodiment, as illustrated in the detail of FIG. 8, the mounting post bore 216 is closed by a plug 218. In this embodiment, the plug 218 is generally top-hat shaped, with a cup-like portion 220 received within the bore 216 and a rim 222 engaging an inwardly facing surface 224 of the mounting post 12, 14 and preventing outward movement of the plug 218 through the bore 216. The cup-like portion 220 has a cylindrical wall 226 and a base wall 228. The cylindrical wall 226 and base wall 228 engage the respective end of the hinge pins 36 and prevent direct contact between the hinge pins 36 and the mounting posts 12, 14.

The plug 218 may be secured in the bore 216 by, for example an interference fit or other means for example adhesive, but that may not be necessary since the plug 218 will be prevented from moving inwardly when the valve 2 is assembled by virtue of the hinge pins 36, 38.

A possible advantage of this embodiment is that it may be easier to manufacture that the earlier described embodiments since a through bore 220 may be drilled or otherwise produced in the first and second mounting posts, which may be easier that machining a blind bore 16 or counterbore 116 as in the earlier embodiments. Moreover, the plug 218 can be made from a stronger and/or more durable material than the valve housing 14. This provides appropriate durability and strength at the moving parts, without making the mounting posts 12, 14 and possibly also the entire valve housing 4 from such a material which would potentially add weight to the system.

The ends of the hinge pins 36 are received in the plug 218 and the cylindrical wall 226 and base wall 228 isolate the hinge pins 36 from the mounting posts 12, 14. Thus, any wear between the components will occur at the plug 218 rather than at the mounting posts 12, 14. Thus it may be possible, for example, to make the valve housing 4 from a light material such as an aluminium alloy and make the plug from a stronger material such as steel. The hinge pins 36 are also likely to be made from a strong material such as steel, which means that the hinge pins will not damage the lighter and much softer aluminium valve housing 4 as the contact of the hinge pin 36 is with the stronger and harder plug 218. This allows lighter materials to be used for the valve housing 4 to minimize weight Other forms of plug may be used, for example one which close off the through bore 220 from the outer end of the bore, but these may not be so advantageous since they will have to be securely fastened into the through bore 220 to prevent them loosening and potentially falling out of the bore 220, thereby potentially allowing the hinge pin to become loose.

The plug 218 may be formed with an opening in the base wall 228 should it be required to access the end of the respective hinge pin 36, 38.

Also, while the hinge pin retaining element has been illustrated as being a part of the fastener, it could be a separate element which is retained in position by the fastener. In addition, while a threaded fastener has been illustrated, other forms of fastener may also be used.

The invention claimed is:

1. A check valve comprising:
   a valve housing defining a valve opening and a web extending across the valve opening;
   first and second mounting posts provided on the valve housing on opposite sides of the opening and extending away from the opening, each mounting post having a transverse bore formed therein, the end of the transverse bore remote from the valve opening being at least partially closed;
   a central mounting post mounted to the web and extending away from the valve opening, the central mounting post having a first bore extending in a longitudinal direction and a second bore formed transversely therethrough, the second bore being aligned with the transverse bores provided in the first and second mounting posts;
   a first hinge pin mounted between the transverse bore of the first mounting post and the second, transverse bore of the central mounting post;

a second hinge pin mounted between the transverse bore of the second mounting post and the second, transverse bore of the central mounting post;

a hinge pin retaining element arranged between adjacent ends of the first and second hinge pins within the second, transverse bore of the central mounting post;

a fastener received in the longitudinal bore of the central mounting post for fastening the central mounting post to the web and maintaining the hinge pin retaining element between the adjacent ends of the first and second hinge pins; and a pair of flapper elements pivotably mounted to first and second hinge pins for rotation between an open position in which they permit fluid flow through the opening and a closed position in which they prevent fluid flow through the opening.

2. A check valve as claimed in claim 1, wherein the first and second mounting posts are formed integrally with the valve housing.

3. A check valve as claimed in claim 1, wherein the end of at least one of the transverse bores of the first and second mounting posts is fully closed, for example being a blind bore.

4. A check valve as claimed in claim 1, wherein the at least one transverse bore of the first and second mounting posts is partially closed by a wall having an aperture therethrough to provide access to an end of a respective hinge pin.

5. A check valve as claimed in claim 1, wherein the hinge pin retaining element is formed by a portion of the central mounting post fastener.

6. A check valve as claimed in claim 1, wherein the hinge pin locking member is separate from the central mounting post fastener.

7. A check valve as claimed in claim 1, wherein the central mounting post is received in a recess formed in a surface of the web.

8. A check valve as claimed in claim 1, wherein the central mounting post comprises locating means.

9. A check valve as claimed in claim 1, wherein the central mounting post extends sufficiently from the web so as to form a stop for the flapper elements in their open position.

10. A check valve as claimed in claim 1, further comprising a plug received within the transverse bore of a respective first and second mounting post.

11. A check valve as claimed in claim 10, wherein the plug is made from a stronger, more durable or harder material than that of the respective mounting post.

12. A check valve as claimed in claim 10, wherein the plug receives an end of the respective hinge pin.

13. A check valve as claimed in claim 12 wherein the plug comprises a cup like portion having a cylindrical wall and an end wall which receive the end of the respective hinge pin and, optionally further comprising a rim portion for engaging an inwardly facing surface of the mounting post around the mounting post transverse bore.

14. A method of assembling a check valve as claimed in claim 1 comprising the steps of:
   a) assembling the first and second flapper elements to the first and second hinge pins and the central mounting post, with ends of the first and second hinge pins retracted into the transverse bore of the central mounting post;
   b) positioning the assembly between the first and second mounting posts, with the first and second hinge pins aligned with the transverse bores of the first and second mounting posts;
   c) moving second ends of the first and second hinge pins into the transverse bores of the first and second mounting posts;
   d) positioning the hinge pin retaining element between the first ends of the first and second hinge pins to prevent the hinge pins from retracting from the transverse bores of the first and second mounting posts; and
   e) fastening the fastener within the longitudinal bore of the central mounting post to fasten the central mounting post to the web and to retain the hinge pin retaining element in its position.

15. A method as claimed in claim 14, wherein the hinge pin retaining element is a part of the fastener member whereby steps d) and e) are effected simultaneously.

* * * * *